(12) United States Patent
Gonzalez et al.

(10) Patent No.: US 8,365,720 B2
(45) Date of Patent: Feb. 5, 2013

(54) SOLAR CONCENTRATION PLANT FOR THE PRODUCTION OF SUPERHEATED STEAM

(75) Inventors: Marcelino Sanchez Gonzalez, Seville (ES); Rafael Osuna Gonzalez-Aguilar, Seville (ES); Valerio Fernandez Quero, Seville (ES); Raul Navio Gilaberte, Seville (ES)

(73) Assignee: Abengoa Solar New Technologies, S.A., Sevilla (ES)

( * ) Notice: Subject to any disclaimer, the term of this patent is extended or adjusted under 35 U.S.C. 154(b) by 0 days.

(21) Appl. No.: 13/200,762

(22) Filed: Sep. 30, 2011

(65) Prior Publication Data

US 2012/0090323 A1   Apr. 19, 2012

Related U.S. Application Data

(62) Division of application No. 12/156,816, filed on Jun. 5, 2008, now Pat. No. 8,181,641.

(30) Foreign Application Priority Data

Jun. 7, 2007 (ES) .................................. 200701577
May 20, 2008 (ES) .................................. 200801471

(51) Int. Cl.
*F24J 2/04* (2006.01)
(52) U.S. Cl. ........ 126/600; 126/714; 126/640; 126/634; 60/641.15

(58) Field of Classification Search ............... 126/600, 126/634, 714, 640, 643, 684, 572; 60/641.1, 60/641.15
See application file for complete search history.

(56) References Cited

U.S. PATENT DOCUMENTS

| 4,265,223 | A  | * | 5/1981  | Miserlis et al. | ............. | 126/592 |
| 8,001,960 | B2 | * | 8/2011  | Gilon et al.    | ............. | 126/600 |
| 2008/0302314 | A1 | * | 12/2008 | Gonzalez et al. | ............. | 122/1 R |
| 2009/0277443 | A1 | * | 11/2009 | Jukkola et al.  | ............. | 126/643 |
| 2010/0191378 | A1 | * | 7/2010  | Gilon et al.    | ............. | 700/275 |
| 2011/0220091 | A1 | * | 9/2011  | Kroyzer         | ............. | 126/572 |

FOREIGN PATENT DOCUMENTS

DE   10248068   5/2004

* cited by examiner

*Primary Examiner* — Alfred Basichas
(74) *Attorney, Agent, or Firm* — John C. McMahon

(57) ABSTRACT

A solar concentration plant which uses water/steam as a fluid, in any thermodynamic cycle for the exploitation of process heat, comprising an evaporation subsystem, where saturated steam is produced, a superheater subsystem through which the steam reaches the required conditions of pressure and temperature at the turbine inlet, and an attemperation system interconnected by a drum. A field of heliostats is pointed towards either of the subsystems (evaporator or superheater), in such a way to control both the pressure within the drum and the outlet temperature of the superheated steam.

10 Claims, 4 Drawing Sheets

SOLAR CONCENTRATION PLANT FOR THE PRODUCTION OF SUPERHEATED STEAM

CROSS-REFERENCE TO RELATED APPLICATIONS

Figure 1:
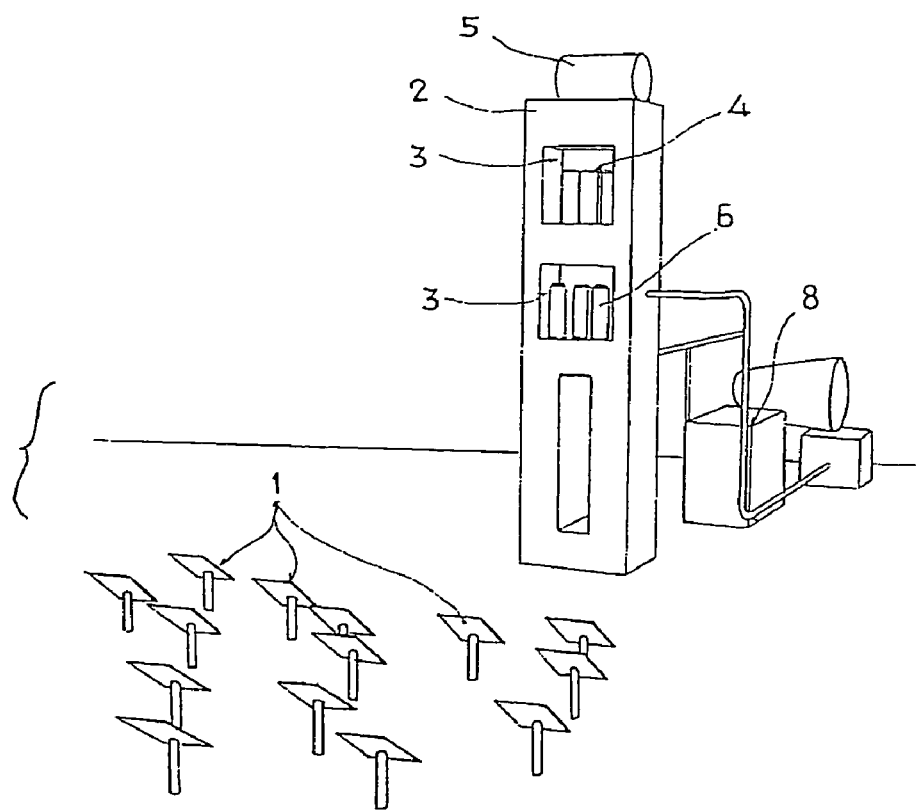

This application is a divisional of U.S. patent application Ser. No. 12/156,816 filed Jun. 5, 2008 the disclosure of which is incorporated by reference herein.

The present invention relates to solar concentration plants with a physical separation between the evaporator and the superheater and with a dynamic control capable of adapting the heliostat field, in order to produce superheated steam in a controlled, efficient manner, in order to thus assure the continued durability and normal operation of said solar plant in its different applications: the production of electricity, the production of process heat, the production of solar fuels and their application to thermochemical processes.

BACKGROUND OF THE INVENTION

While solar radiation is a source of thermal energy of a high temperature at its origin, the use of the same under the conditions of the flow which reaches the surface of the earth destroys practically all its potential for conversion into work due to the drastic reduction in the temperature available in the flow. For this reason, thermoelectric solar plants and optical concentration systems are used, which achieve a greater density of the flow and thus higher temperatures.

Currently, there exist three main different technologies developed for use in Solar Facilities, these being: the central receiver type, cylindrical-parabolic collectors and Stirling discs. All of these make use only of the direct component of solar radiation, which makes it necessary for them to feature solar tracking devices:

1. Central receiver-type systems (3D) use mirrors of a large surface area (40-125 m2 per unit) called heliostats, which feature a control system in order to reflect the direct solar radiation onto a central receiver located at the top of a tower. By means of this technology, the concentrated solar radiation heats a fluid in the interior of the receiver to a temperature of as much as 1000.degree. C.; this thermal energy may subsequently be used for the generation of electricity.

2. Regarding cylindrical-parabolic collectors (2D), the direct solar radiation is reflected by cylindrical-parabolic mirrors which concentrate the same onto a receiving or absorbing tube through which there circulates a fluid which is heated as a consequence of the concentrated solar radiation which falls on the same at a maximum temperature of 400.degree. C. in this way, the solar radiation is converted into thermal energy which is used subsequently for the generation of electricity by means of a Rankine water/steam cycle.

A variation in this technology is embodied in linear Fresnel concentration systems, in which the parabolic mirror is replaced by a Fresnel discretization with mirrors of smaller dimensions, which may be flat or may feature a slight curvature at their axis, and by means of controlling their axial orientation allow the concentration of solar energy on the absorbing tube, which in this type of applications usually remains static.

3. Parabolic Stirling disc systems (3D) use a surface area of mirrors installed on a parabola of revolution which reflect and concentrate the rays of the sun onto a focal point, at which the receiver is located; in said receiver the working fluid of a Stirling engine is heated; this engine in turn operates a small electrical generator.

In central-receiver systems, water-steam technology is currently the most conventional. The steam is produced and superheated in the solar receiver at temperatures of approximately 500.degree. C. and 10 MPa (100 bar) and is sent directly to the turbine. In order to reduce the impact of transitional conditions (the passing of clouds, etc.) a storage system is used (melted salts or a rock/oil thermocline). This concept was the first to be tested due to its permitting the transposition of the habitual techniques of thermal power plants and to its permitting the direct access of the steam issuing from the solar receiver into the turbine.

The use of superheated steam may allow the implementation of thermodynamic cycles of a higher efficiency in power plants.

The difficulty of solar technology for the production of superheated steam lies in the demanding conditions of temperature at which the receiver must operate. The walls of its pipes are continuously subjected to thermal cycles between ambient temperature, the temperature of the steam with which the receiver is fed (250 to 310.degree. C.), and the temperature necessary at its wall for the generation of superheated steam at 540.degree. C. or nearly 600.degree. C. Unlike the receivers which generate saturated steam, which operate at a temperature which is almost uniform throughout their sections (330.degree. C.), superheated steam receivers increase the temperature of their pipes in accordance with their greater proximity to the steam outlet zone.

The difficulties encountered in the experiments carried out on superheated steam receivers in the eighties were centered on two main aspects:

A lack of controllability of the system, especially when faced with transitional conditions, the passing of clouds, etc., due mainly to the bad thermal properties of the superheated steam. In both receivers, the most frequent structural fault was the appearance of cracks. The thermal tension due to the great differences in temperature brought about the appearance of cracks in the interstitial weld between subpanels. This situation occurred fundamentally during downtime, when the water in a subpanel, at saturation temperature, flowed upwards, where the temperature was still that of the superheated steam, while in the adjacent subpanel this phenomenon did not occur The problem of operating at high pressures, which made necessary greater thicknesses of the walls of the piping; this, when the time came to transfer high densities of power to the heat-carrying fluid, necessarily implied high thermal gradients.

The invention proposed below therefore deals with the agglutination of the advantages of the use of high-temperature steam, resolving the existing risks, achieving a greater control over the plant and thus favouring the stability and durability of the same.

DESCRIPTION OF THE INVENTION

The present invention relates to a plant and a procedure which uses water/steam as a heat-carrying fluid for the production of superheated steam in any thermodynamic cycle or process heat exploitation system, comprised of an evaporation subsystem where saturated steam is produced under the conditions of pressure of the system, and a superheater subsystem where the steam reaches the required conditions of pressure and temperature for entry into the turbine. With regard to other preceding proposals which located the superheater subsystem modules in the very close proximity of (when not superimposed on) the evaporator subsystem modules, the strategic development proposed herein is based on the physical and independent separation of the evaporator and the superheater.

The fact of separating the evaporation stage from that of superheating reduces the technological risk as, due to there not being a change of phase in the receiver itself, neither are there any problems of high thermal gradients derived from the different film coefficients of both phases. In addition to physically and independently separating the evaporator and the superheater by means of the inclusion of an intermediate drum, this incorporates the carrying out of a strategic control of the pointing of the heliostat field which is independent for both receiving subsystems, the evaporator subsystem and the superheater subsystem. This strategic control consists of a dynamic control, capable of adapting the heliostat field, in order that after the provision of energy, optimal conditions of heat and pressure for entry into the turbine are maintained stable. To do this, the heliostat field is pointed towards one receiver or the other (evaporator or superheater) depending on the current need. By this it should be understood that there is a possibility of carrying out the pointing of individual heliostats or groups of the same, towards either the evaporator receiver or the superheater receiver, in such a way that they control jointly both the pressure in the drum and the superheater outlet temperature. In this way, part of the heliostat field will be directed towards the evaporator and the other part towards the superheater, thus achieving greater control over the plant and greater stability of the same.

In central receiver technology, the receiver is located at the top of the tower, and the heliostats concentrate the solar energy onto the same. The energy exchange occurs in the receiver, transferring the photonic energy of the concentrated beam of light coming from the field of heliostats to a heat-carrying fluid, increasing its enthalpy. There are many different ways of classifying the receivers. If we classify the receivers in accordance with their geometry, we may define the "cavity" type receivers as those which are located at the top of the tower within a hollow or cavity; in this way, the thermal losses due to radiation or convection are minimised. The receivers may be constituted in different ways, the most common for the direct generation of steam in central receiver systems being tubular solar panels.

This receiver is designed in accordance with a particular geometric configuration, generally defined by a series of sub-panels constituted by the array of tubes which form the evaporator or the superheater.

The solar plants disclosed in the present invention are comprised of a three-dimensional solar concentration system with a central tower which includes:

a) A receiving evaporation subsystem with an evaporator for the evaporation of water b) A receiving superheater subsystem, with a number of superheaters (primary and secondary or final) for the superheating of the steam produced, located in the same or different cavities and physically located independently from the evaporators c) A drum as a means of connection between the two subsystems, that of evaporation and that of superheating d) A strategic control for the pointing of the heliostat field towards the evaporator receivers and the superheater receivers These may include between the primary superheater and the secondary or final superheater a series of attemperators or an attemperation system, thus achieving a more precise control over the pressure- and temperature-related conditions of the superheated steam at the outlet of the superheater receiver.

To complement the description carried out above and with the aim of aiding a better understanding of the characteristics of the invention, a detailed description of a preferred embodiment will be carried out below, by means of a set of drawings which accompany this specification and in which, by way of guidance and of a non-limitative nature, the following has been portrayed:

FIG. 1 portrays a diagram of a twin-cavity tower, the first cavity housing an evaporator and the second cavity housing a superheater.

Figure 2:
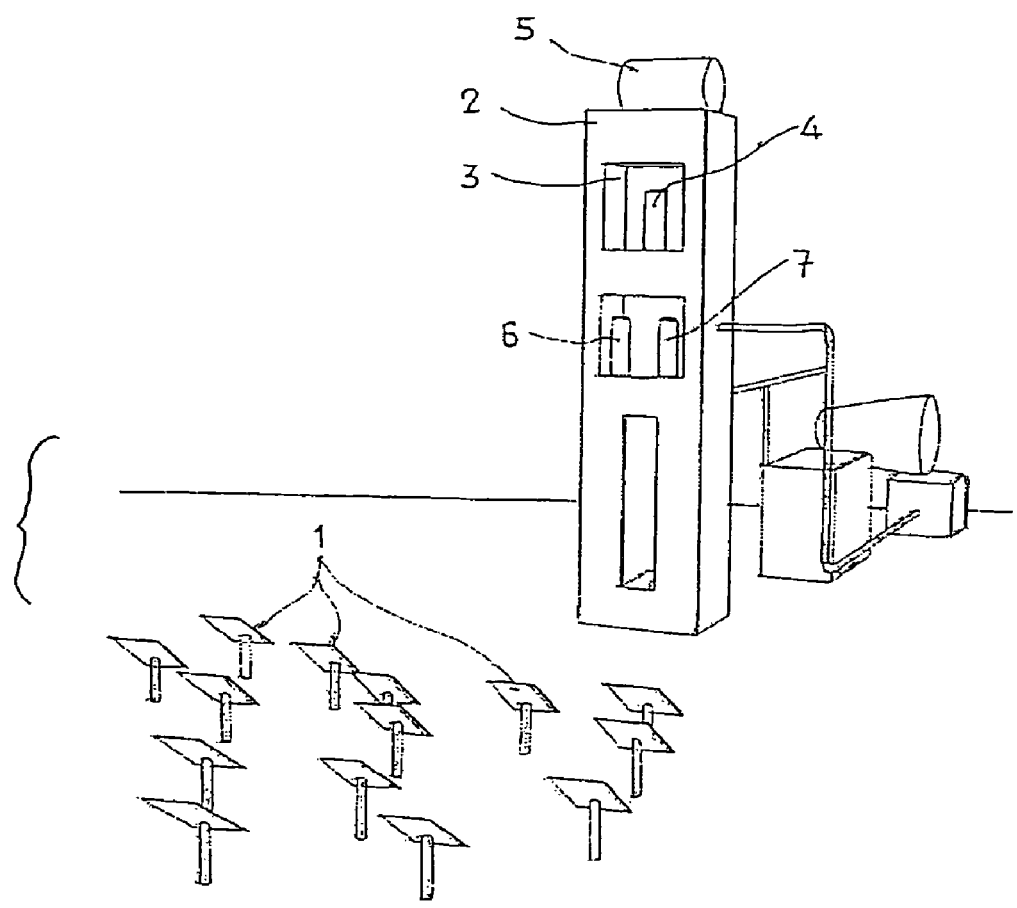

FIG. 2 portrays a diagram of a twin-cavity tower, the first cavity housing an evaporator and the second cavity housing two superheaters.

Figure 3:
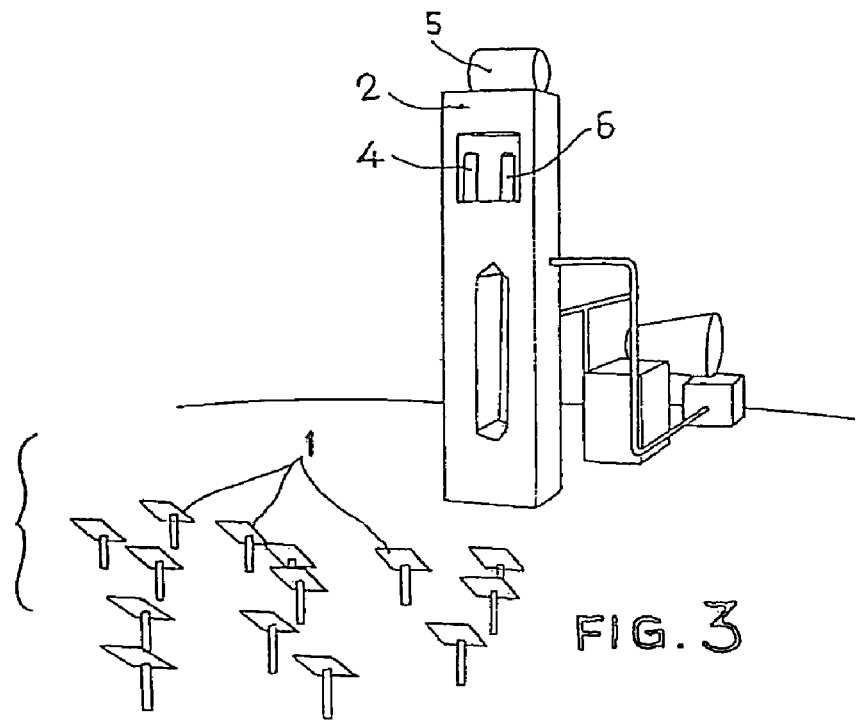

FIG. 3 portrays a diagram of a single-cavity tower, with a single cavity housing an evaporator and a superheater.

Figure 4:
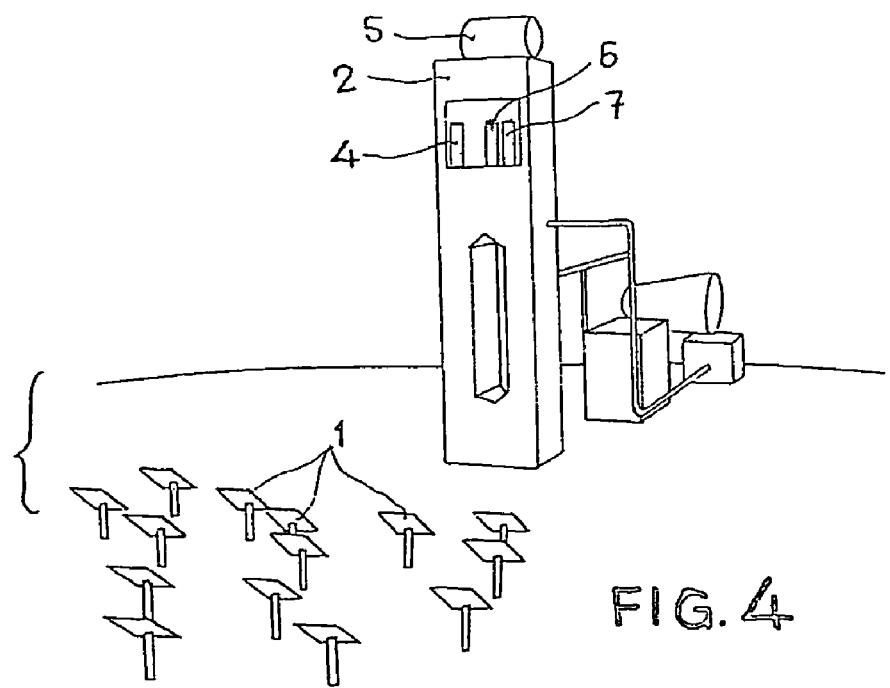

FIG. 4 portrays a diagram of a single-cavity tower, with a single cavity housing an evaporator and two or more superheaters.

Figure 5:
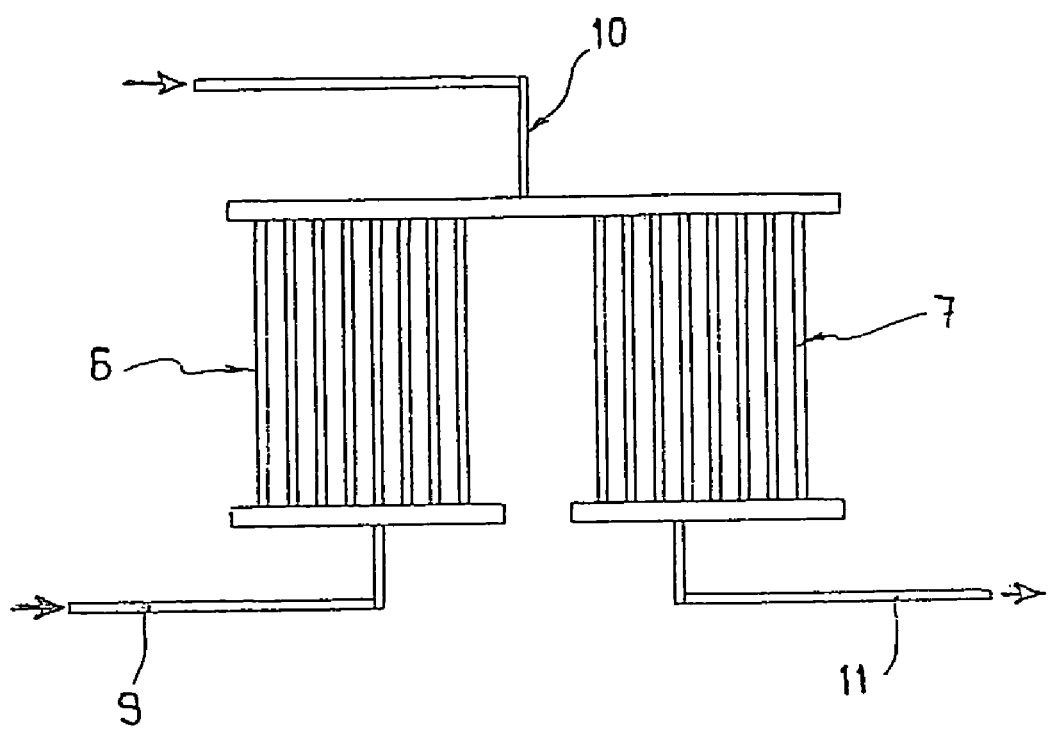

FIG. 5 portrays a diagram of the attemperation system to control the temperature of the steam at the outlet of the final superheater.

In this figure, the numeric references correspond to the following parts and elements:

1.—Heliostats.
2.—Central tower.
3.—Cavity.
4.—Evaporator.
5.—Drum.
6.—Primary superheater.
7.—Secondary superheater.
8.—Fossil backup system
9.—Saturated steam from drum.
10.—Attemperation system.
11.—Superheated steam.

In the application of the concept of the plant of this invention, central tower and receiver technology is used to carry out a solar superheating process on damp or saturated steam.

As may be seen in FIG. 1, this solar plant is comprised of a three-dimensional solar concentration system with a central tower (2) which features two cavities (3), one of these housing an evaporating receiver (4) for the evaporation of water, and the other featuring a superheating receiver (6) for the superheating of the steam produced, and a field of heliostats (1).

In order to comply with the aim of superheating, it is proposed to carry out a series of heliostat pointing strategies by means of a dynamic control system adapted to the field of heliostats in such a way that the conditions of temperature and pressure of the steam at the inlet of the turbine may be maintained constant, directing part of the field of heliostats towards the evaporator (4) and the other part towards the superheater (6). That is to say, the proposal is the use of concentrated radiation from a percentage of the field of heliostats for the evaporation phase, and the use of the remainder of the field of heliostats for the concentration of radiation destined for the steam superheater (6) until temperatures even higher than 550.degree. C. are reached, in such a way that the two subsystems (evaporator and superheater) are separate within the receiver. For the preheating of the water which is to be evaporated a fossil fuel backup system (8) is incorporated.

In FIG. 2, a detail of a receiver with two cavities may be seen; here the superheating is carried out in two stages, by means of a primary superheater (6) and another secondary superheater (7), both of these located in a second cavity (3). The steam coming from the evaporator (4), located in a first cavity (3) and in which the water reaches its saturation temperature, changing to its steam stage, is superheated in the superheater until temperatures in the region of 550.degree. C are reached. Located between the two elements (evaporator (4) and superheaters (6) and (7)) there will be a drum (5) whose purpose it is to separate the water in a liquid state from the steam which will enter the superheater.

FIGS. 3 and 4 portray a tower (2) with a single cavity in which the two subsystems, evaporator and superheater, are located. FIG. 3 portrays the simplest case in which there is a single superheater (6) and an evaporator (4). In the case of FIG. 4, two superheaters are included, primary (6) and secondary (7), and an evaporator (4).

In the cases where the tower contains two or more superheaters (FIGS. 2 and 4), the saturated steam (9) coming from the drum (5), after passing through the primary superheater (6), is subjected to a pressure and temperature control process by means of an attemperation system (10), as may be seen in FIG. 4. Subsequently, it passes through the secondary or final superheater (7), thus obtaining superheated steam (11) under more controlled conditions of pressure and temperature.

The aim of the installation disclosed above is to achieve a more efficient, less costly result than the current solar concentration technologies, clearly improving the controllability of the plant when faced by transitional conditions, and the durability and stability of the same. The final control of the plant envisages both the combined use of all these control strategies and the independent use of the same, in accordance with the operating mode in question.

Its application is particularly suited in the fields of the production of electricity, of process heat and solar fuels, as well as in thermal processes.

What is claimed and desired to be secured by Letters Patent is as follows:

1. A facility for the production of superheated steam wherein water/steam is superheated in a three-dimensional solar concentration system in a central tower, the facility comprising:
   a) an evaporation receiver subsystem;
   b) a superheater receiver subsystem for the superheating of the steam produced that is physically located independently from the evaporation subsystem;
   c) a drum flow connecting between the evaporation receiver subsystem and the superheater receiver subsystem; and
   d) a strategic controller for the pointing of a plurality of heliostats in a field of heliostats selectively between the evaporation receiver subsystem and the superheater receiver subsystem in such a way that the subsystems jointly control both the pressure within the drum and an outlet temperature of superheated steam produced therein.

2. The facility for the production of superheated steam, as called for in claim 1, wherein the superheater receiver subsystem has at least first and second superheaters.

3. The facility for the production of superheated steam, as called for in claim 2, including an attemperation system between the first and second primary superheaters.

4. The facility for the production of superheated steam, as called for in claim 1, wherein the superheater receiver subsystem has one superheater.

5. The facility for the production of superheated steam, as called for in claim 1, wherein the evaporation receiver subsystem has one evaporator.

6. A procedure for the production of superheated steam, characterised in that it consists of superheating water/steam by means of a three-dimensional solar concentration system in a central tower (2) which includes:
   a) an evaporation receiver subsystem;
   b) a superheater received subsystem for the superheating of the steam produced, physically located independently from the evaporation subsystem;
   c) a drum (5) as a means of connection between the two subsystems, that of evaporation and that of superheating; and
   d) a strategic control for the pointing of the field of heliostats (1) towards either subsystem (evaporator or superheater), with individual or group pointing of the heliostats, in such a way that they jointly control both the pressure within the drum (5) and the outlet temperature of the superheated steam (11).

7. A procedure for the production of superheated steam, as claimed in claim 6, characterised in that the superheater subsystem features two or more superheaters (6, 7).

8. A procedure for the production of superheated steam, as claimed in claim 7, characterised in that it features an attemperation system (10) between the primary superheater (6) and the secondary or final superheater (7).

9. A procedure for the production of superheated steam, as claimed in claim 6, characterised in that the superheater subsystem features one superheater (6).

10. A procedure for the production of superheated steam, as claimed in claim 6, characterised in that the evaporation subsystem features one evaporator (4).

* * * * *